UNITED STATES PATENT OFFICE.

JACOB BLUMER, OF PEEKSKILL, NEW YORK.

PROCESS OF MANUFACTURING YEAST.

No. 855,276.

Specification of Letters Patent.

Patented May 28, 1907.

Application filed July 25, 1906. Serial No. 327,636.

*To all whom it may concern:*

Be it known that I, JACOB BLUMER, a citizen of the United States, and a resident of Peekskill, in the county of Westchester and State of New York, have invented a new and Improved Process of Manufacturing Yeast, of which the following is a full, clear, and exact description.

This invention relates to methods of manufacturing yeast in general, and the main object is to supply the yeast plant in process of propagation with a cheap nutriment which is exceedingly rich in soluble nitrogenous substances, thereby enabling the manufacture of a yeast of great leavening power, and also producing a larger yield of yeast.

My method is especially useful for the manufacture of yeast from molasses and the result therefrom is an article of the highest quality and of such immense leavening power that one part of this yeast will do the work of two parts of the usual compressed yeast of the trade, or if desiccated it will still retain enough leavening power that one pound of dried yeast is equal to one pound of regular compressed yeast of the market.

The above-mentioned nutriment of soluble nitrogenous substances, I extract from cotton-seed meal which is a staple article of this country but which heretofore has never been used for the manufacture of yeast.

I will describe the process of manufacturing yeast embodying my invention, and then point out the novel features in the appended claims.

It is known that there are a good many microbes which produce enzyms which have the faculty of reducing albuminous substances to peptones and in a number of cases this enzymic action goes together with the formation of lactic acid, and the one is in direct proportion to the other. My invention involves this lactic acid formation, together with the proportionate enzymic action of the lactic acid organisms.

In carrying out my method 5000 lbs. of cotton-seed meal and about 3000 gallons of warm water of about 60° C. are mashed or mixed together in a tank, the temperature of the finished mixture being about 50 to 55° C. which is best adapted for the formation of lactic acid. The mixture is kept at this temperature for 48 to 72 hours and during this time enough lactic acid and peptic enzyms have formed to peptonize the nitrogenous substances contained in the cotton-seed meal and make them thus available for yeast food. In order to start a healthy lactic acid formation, the first time the above-mentioned cotton-seed mash is made it is preferable to mix with it about 250 lbs. (5% of the cotton-seed meal) of finely ground barley malt or else a small amount of pure cultured lactic acid organisms, but subsequently, it is only necessary to take 30 or 40 gallons of the peptonized cotton-seed mash—which I will call hereafter, peptone mash—to the newly-prepared mash as these 30 or 40 gallons will contain more than enough lactic acid organisms to start the proper lactic acid fermentation. At the expiration of 48 to 72 hours, the peptone mash is transferred into a suitable boiler or cooker and is cooked for about 1½ hours under a pressure of 25 to 35 lbs. This is done to get as much as possible of the cotton-seed meal into solution and also to facilitate the separation of the liquid containing the peptones from the remaining residue which operation is preferably done with filter presses. The clear liquid running from the filter presses is absolutely sterile and represents the nutriment which I employ for the propagation of yeast together with sterilized molasses or other saccharine solutions. The cakes remaining as residue in the filter presses are valuable for feeding cattle.

The molasses which I use for the manufacture of yeast is a very low grade of molasses; and to the filtered peptone mash resulting from 5000 lbs. of cotton-seed meal, I add 3000 gallons of it, taking care that the molasses is perfectly sterilized which is accomplished by diluting it with about 3000 gallons of water, heating it to nearly the boiling point and letting it stand in a covered tank for about 24 hours. At the end of this time I cool the molasses to about 26° C., mix it with the filtered peptone mash which previously also was cooled to about 26° C. and with enough water to bring the specific gravity of the solution to about 1.04, set it with pure cultured mother yeast and ferment and aerate the whole mixture in the usual manner known to those conversant with the manufacture of yeast. After about 15 to 18 hours of fermentation, when the density of the liquid has been reduced to about 1.012 specific gravity all the yeast is formed, the aeration is stopped and the yeast is allowed to settle to the bottom of the tank. The liquid standing above the yeast contains about 8 to 9% of proof alcohol; it is drawn off and used for distillation, in the usual manner. The yeast on the bottom of the tank is washed three or four times with fresh cold water mixed with a small amount of starch, and pumped into filter presses in order to get it in the shape of compressed yeast. The yeast may be put on the market in this form or it may be further concentrated by drying it at a low temperature in any of the known manners.

Having thus described my invention, I claim as new and desire to secure by Letters Patent:

1. The process of manufacturing yeast by the use of cotton-seed meal, consisting in peptonizing the nitrogenous substances contained therein, extracting the same from the solid residue, mixing the extract with a saccharine solution, then inoculating the same with yeast, then propagating yeast, and then separating the yeast.

2. The process of manufacturing yeast by the use of cotton-seed meal, consisting in peptonizing the nitrogenous substances contained therein, boiling the same under pressure, then extracting the same from the solid residue, then mixing the extract with sterilized saccharine solution, then inoculating the same with yeast, then propagating yeast, and then separating the yeast.

3. The process of manufacturing yeast by the use of cotton-seed meal, consisting in mixing the meal with water, heating the mixture to a degree best suited to lactic acid formation, keeping the same approximately at the same degree of temperature for a period of time, then extracting the liquid from the solid residue, then mixing the extract with molasses, then inoculating the same with yeast, then propagating yeast, and then separating the yeast.

4. The process of manufactuing yeast by the use of cotton-seed meal, consisting in mixing the meal with water, heating the mixture to a temperature best suited to lactic acid formation, then keeping the same at approximately the same temperature for a period of time, then boiling the same under pressure, then extracting the liquid from the solid residue, then mixing the extract with sterilized molasses, then inoculating the same with yeast, then propagating yeast, and then separating the yeast.

In testimony whereof I have signed my name to this specification in the presence of two subscribing witnesses.

JACOB BLUMER.

Witnesses
JNO. M. RITTER,
C. R. FERGUSON.